United States Patent [19]
Henke et al.

[11] Patent Number: 4,781,169
[45] Date of Patent: Nov. 1, 1988

[54] OVEN WITH RADIANT PANEL

[75] Inventors: Mitchell C. Henke; Carol S. Nealley; Effie J. Lee; Daniel S. Kaminski, all of Fort Wayne, Ind.

[73] Assignee: Lincoln Foodservice Products, Inc., Fort Wayne, Ind.

[21] Appl. No.: 38,021

[22] Filed: Apr. 14, 1987

[51] Int. Cl.⁴ .......................... A21B 1/00; A23L 3/00
[52] U.S. Cl. .................. 126/21 A; 126/39 D; 99/477; 99/443 C
[58] Field of Search .......... 126/21 A, 39 D; 99/443 C, 447, 401, 386; 432/10, 11, 148

[56] References Cited
U.S. PATENT DOCUMENTS

| 784,854 | 3/1905 | Grace |  |
| 2,908,235 | 10/1959 | Naylor et al. | 107/63 |
| 4,154,861 | 5/1979 | Smith | 426/466 |
| 4,383,823 | 5/1983 | Williams et al. | 432/148 |
| 4,438,572 | 3/1984 | Kaminski | 34/218 |
| 4,506,652 | 3/1985 | Baker et al. | 126/21 |
| 4,576,090 | 3/1986 | Burtea | 126/21 A |
| 4,591,333 | 5/1986 | Henke | 432/10 |
| 4,679,542 | 7/1987 | Smith et al. | 126/21 A |

Primary Examiner—Larry Jones
Attorney, Agent, or Firm—Albert L. Jeffers

[57] ABSTRACT

A food preparation oven comprising a plurality of radiant panel ducts which include apertures for directing streams of heated air toward a food product within the heating chamber. The radiant panels are made of highly thermal conductive aluminum and the outer surfaces thereof facing the food product are of a black color so as to radiate infrared energy toward the food product.

33 Claims, 6 Drawing Sheets

OVEN WITH RADIANT PANEL

BACKGROUND OF THE INVENTION

The present invention relates to an oven for heating, cooking and baking food products including a radiant panel which is heated by a stream of moving air to thereby supply heat energy to a food product by means of radiant energy. The invention furthermore relates to an oven for preparing a food product wherein it is desirable for one surface of the food product to be heated at a first energy input rate and a second surface of the food product to be heated at a second energy input rate, wherein the second rate is greater than the first rate.

In restaurants and other food preparation establishments, particularly fast food restaurants, the speed at which certain foods, such as pizza, can be prepared is extremely important. Both the restaurant operators and diners prefer that the food be prepared in a very short amount of time, but that the quality of the food not suffer because of the short preparation time. Certain types of food are best prepared when the rate of heat energy input into one surface of the food product is different than the rate of heat energy input into another surface of the food product. This is particularly true with a food such as pizzas, which have become very popular fast food items. Pizzas normally have a crust, a filling composed of vegetables, meats and cheeses and a top layer of cheese onto which may be placed a variety of toppings. Thus, the top surface of the pizza requires that a limited amount of heat energy is imparted thereto so that the cheeses will melt, and after baking will have a milky white appearance with just a small amount of browning. At the same time, the crust, or bottom surface of the pizza, must be brown. Certain pizza products which have become very popular are referred to as "deep dish" or "stuffed" pizzas, which have a greater thickness than conventional pizzas and therefore require a greater amount of heat energy input. However, a smaller amount of heat energy should be supplied through the top of the pizza than through the bottom of the pizza because the application of a large amount of heat to the top surface tends to cause the cheese to burn, and will also cause certain toppings, such as thinly sliced onions to scorch. Accordingly, pizza products, and in particular very thick pizza products, require that the rate of heat energy input into the top surface be lower than the rate of heat energy input into the bottom surface thereof.

Other food products also benefit from heat being applied thereto during baking at two different rates for the top and bottom surfaces. For example, when baking sheet cakes, the batter is typically contained within an open top metal pan. It is desirable that the heat energy input into the batter be controlled in such a way that the cake will not begin to bake prematurely at one end of the pan, thereby resulting in drifting of the batter which produces an uneven cake.

An apparatus and method for successfully preparing food products, such as pizzas, is described in U.S. Pat. No. 4,154,861. This patent discloses an impingement process wherein a conveyor belt travels through an oven cavity and on which the pans containing the pizzas are located. Columns of hot air are directed at localized areas of the pizza to bake the pizza and to carry away moisture and other particles resulting from the cooking process. This method and this type of oven has been used successfully by pizza establishments for a number of years. However, if this basic type of oven were used with stuffed types of pizzas or pizzas having delicate tops, the tops of the pizzas can be burned while the inner portion of the pizza and the crust would not yet be properly baked.

U.S. Pat. No. 4,462,383 discloses an impingement oven for preparing foods wherein a pair of duct fingers is provided, each finger having a jet plate through which hot air is vented in standing columns to impinge on food products located in an oven cavity between the duct fingers. The food travels on a conveyor belt through the oven cavity between the duct fingers as it is being cooked.

If the temperatures in the impingement ovens of the type discussed above are lowered so that the top surfaces of the food products would not burn, the temperatures in the oven would be too low to effectively bake or cook the inside of the product, such as a pizza product, in the desired amount of time. It is therefore desirable to provide an impingement oven wherein the heat energy supplied to the bottom surface of a food product, such as a thick pizza, is greater than the heat energy which is supplied to the top surface thereof.

In the case of certain baked food products, such as sheet cakes, the use of a conventional impingement oven will often cause non-uniform baking. As the pan containing the batter moves by conveyor into the oven, the leading edge thereof is subjected to columns of high temperature air, which immediately cause the batter to begin to bake and rise. This rising of the baked batter displaces unbaked batter toward the trailing end of the pan, thereby causing batter drift which results in an uneven cake with the leading portion of the cake being thinner than the trailing portion thereof.

U.S. Pat. No. 4,591,333 discloses a prior art oven including radiant panels which are positioned above the conveyor and impart heat to the food product by means of infrared radiation. Such infrared radiation imparts heat at a much lower rate than columns of impinging air, which are directed to the food product from impingement finger ducts located below the conveyor. In one embodiment of the oven disclosed in U.S. Pat. No. 4,591,333, conventional impingement fingers are blocked off by means of highly thermally conductive radiant energy plates, which deflect the impinging air laterally and upwardly away from the food product, yet includes an emissive outer surface which, when the panel becomes heated, radiates infrared energy toward the food product. In a second embodiment, the apertured lower plate of the impingement finger is replaced by a solid emissive radiant panel having corner apertures to permit pressurized air to escape the duct and be drawn back into the plenum.

Although the oven disclosed in U.S. Pat. No. 4,591,333 has been successful in enabling a lower amount of heat energy to be applied to the upper surface of a food product than is applied to the lower surface thereof, it has been found that there are certain aspects of the oven which can be further improved upon. For example, since the air escaping from the upper radiant panel ducts is directed upwardly rather than downwardly as is the case in a conventional impingement oven, hot air tends to collect in the upper portion of the cavity thereby raising the temperature of the upper portion of the cavity. Furthermore, the radiant panels are rigidly connected to the duct fingers, and if the radiant panels are of a different material than the duct fingers, the differing rates of thermal expansion can in some cases result in warpage. For example, if the duct fingers are made of stainless steel, which is a common material for commercial food processing equipment, and the radiant panels are made of highly conductive, anodized aluminum, the rates of expansion between the duct fingers and panel will be different.

U.S. Pat. Nos. 4,154,861; 4,462,383 and 4,591,333 are incorporated herein by reference.

SUMMARY OF THE INVENTION

The present invention, in one form thereof, overcomes the disadvantages of the above-described prior art ovens by providing an improved oven for baking a food product therein. The invention is advantageously applied in an oven where the rate of heat energy input required is less for one surface of a food product than for a second surface of the food product. The oven according to the present invention comprises an enclosure for receiving a food product and a surface for supporting a food product thereon, and means are provided for supplying heat energy to the bottom surface of the food product at a rapid rate and for supplying heat energy to the top surface of a food product at a lower rate. Alternatively, the present invention could be used to apply heat energy at the same rate to both the top and bottom of the product, wherein it is desired to impart heat energy at a lower rate than as is the case with a standard impingement oven.

In a preferred form of the present invention, however, the invention is provided with a plurality of impingement ducts located below the food support surface and with a plurality of radiant panels located above the food support surface, wherein both radiant energy and convection air are directed toward the upper surface of the food product by the radiant panels. In this form of the invention, the impinging columns of air provide heat transfer on localized areas of the lower surface of the food product as it moves through the oven, and the upper surface of the product is heated by a more gradual airflow in combination with emitted infrared radiation.

The radiant panel according to the present invention includes an internal chamber having a thermally conductive wall over which heated air sweeps to thereby impart thermal energy to the wall. The opposite surface of the wall, which faces the food support surface, is highly thermally emissive and radiates infrared radiation toward the food support surface. For example, the emissive surface may be a black anodized surface. After the heated air sweeps over the internal surface of the wall, which wall is imperforate, the heated air then exits the chamber through a plurality of openings directed toward the food support surface within the heating chamber. The duct is preferably constructed such that the heated air is caused to undergo limited swirling which orients the streams of heated air in directions normal to the openings in the chamber so that the heated air flows more directly to the surface of the food product. In a preferred embodiment, the heated air enters the chamber through a centrally located duct, sweeps over the inner surface of the aforementioned wall, after which it changes direction and enters the openings in the chamber in directions generally normal to the openings.

There are a number of advantages to the improved radiant panel design over the prior radiant panel disclosed in U.S. Pat. No. 4,591,333. Because the heated air exits from the radiant panel in a direction toward the food product, which, in the preferred embodiment, is in a downward direction, the heated air can be more readily drawn into the intake of the plenum after it has contacted the food product. This avoids stagnation of heated air in the upper area of the chamber that can cause the temperature in this area to increase to an undesirable level. A further advantage is that the transfer of heat to the upper surface of the product is more uniform in that it is a combination of infrared thermal transfer and transfer by convection air.

The potential problem of warpage is overcome by providing a loose fit between the black anodized aluminum plate and the stainless steel duct, rather than rigidly affixing the aluminum plate to the duct, as was previously done. The clearance between the aluminum plate and stainless steel duct permits the two elements to expand and contract at different rates and to different degrees without producing stresses which can cause warpage of the aluminum plate.

The present invention, in one form thereof, is a food preparation oven having an enclosure defining a chamber for receiving a food product therein, a support for supporting a food product in the chamber and means for producing a moving mass of heated air. A combination convection and radiant energy duct in the chamber connected to the moving mass of air conveys a stream of the heated air, and the duct includes apertures therein directed toward the support for directing heated air onto a food product supported thereon. The combination convection and radiant energy duct further includes a radiator means having an imperforate surface in contact with a stream of air in the duct for absorbing heat from the stream of air in the duct as it sweeps past the surface to thereby radiate heat toward the food product.

The invention, in one form thereof, includes a duct connected to the moving mass of heated air and includes a plurality of apertures facing toward the food support. The duct includes a thermally conductive wall with an outer radiant energy emissive surface for radiating infrared energy toward the support when the wall is heated, the duct including means therein for conveying heated air over a inner surface of the wall to thereby heat the wall and then conveying the heated air toward and through the apertures toward a food product supported in the chamber.

The invention, in another form thereof, is a food preparation oven comprising an enclosure defining a chamber for receiving a food product therein, a support for supporting a food product within the chamber and an air plenum and means connected thereto for producing heated moving air in the plenum, said plenum including an inlet for receiving return air from the chamber and including an outlet. A duct has an inlet connected to the plenum and includes a plurality of outlet openings directed toward the food support within the chamber, the duct further including a radiant panel including a radiant energy qection that is imperforate and has an inner surface in the duct and an outer surface facing the support, the outer surface being infrared emissive. The duct further includes means therein for causing heated air in the duct to impinge on said inner surface in a direction normal thereto and sweep over the inner surface and then flow out of the openings in a direction toward the food product support, whereby impingement on and sweeping of the air over the inner surface causes heat to be transmitted from the inner to the outer surface thereby causing the outer surface to emit infrared radiation.

BRIEF DESCRIPTION OF THE DRAWINGS

The above mentioned and other features and objects of the invention and the manner of attaining them will become more apparent and the invention itself will better understood by reference to the following description of an embodiment of the invention taken in conjunction with the accompanying drawings, wherein.

DETAILED DESCRIPTION OF A PREFERRED EMBODIMENT

Figure 1:
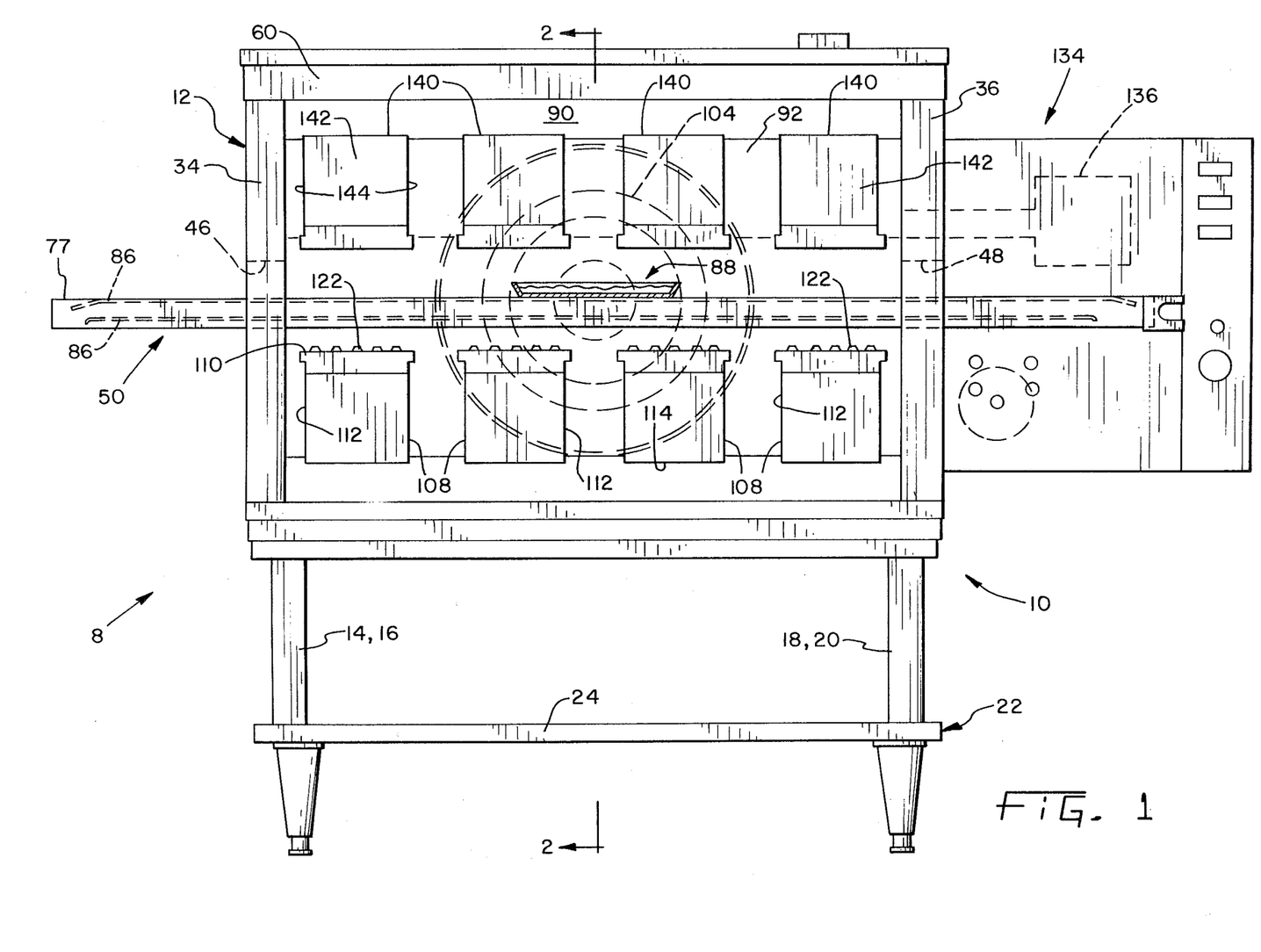
FIG. 1 is a side elevational view of an oven incorporating the present invention.
Figure 2:
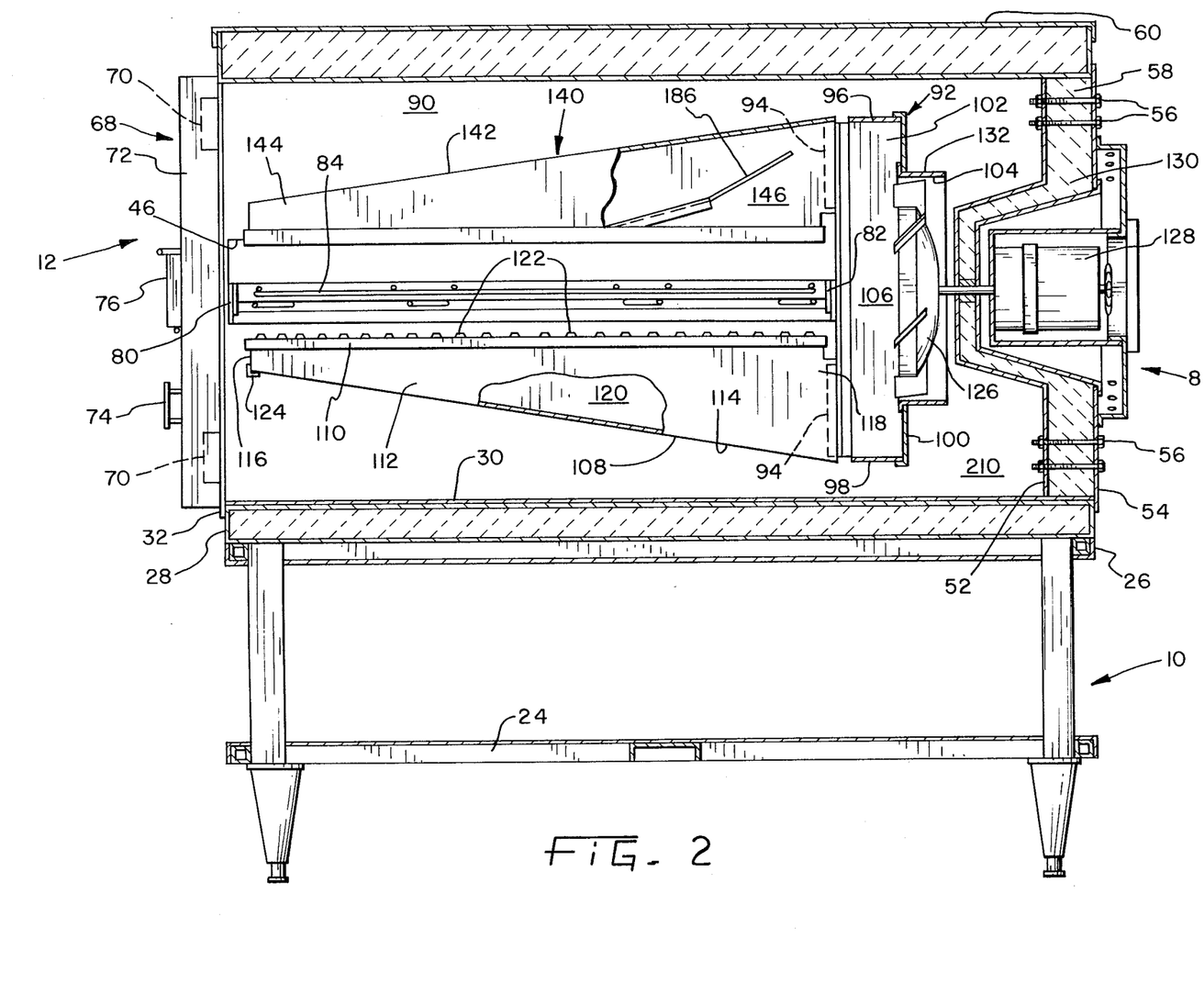
FIG. 2 is a sectional view taken along line 2—2 of FIG. 1 and viewed in the direction of the arrows, wherein portions have been broken away to better illustrate the structure.
Figure 3:
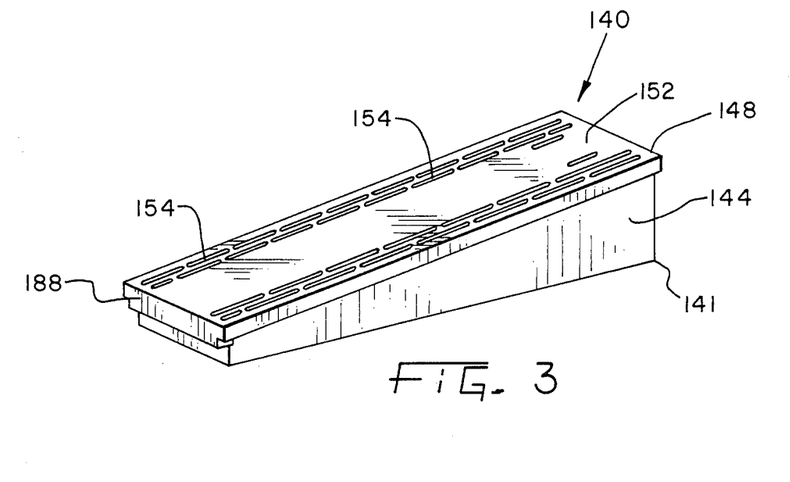
FIG. 3 is a perspective view of the radiant panel and duct assembly according to a preferred embodiment of the present invention.

Referring to FIGS. 1 and 2, oven 8 is shown including stand assembly 10 and cabinet assembly 12. Stand assembly 10 includes a bottom frame 22 secured to legs 14–20 in any suitable manner, such as by welding or suitable fasteners, and also includes a shelf 24 which is secured to bottom frame 22. Stand assembly 10 further includes a top frame 26 (FIG. 2) constructed of tubular steel members secured to legs 14–20, and also includes insulated panel 28. The entire stand assembly 10 is preferably constructed of stainless steel for durability and cleanability.

Cabinet assembly 12 comprises a base cap 30 which is supported on housing 28 and is secured thereto by means of skirt 32. Cabinet assembly 12 includes side wall members 34 and 36, also made of stainless steel, within which is disposed a core of insulation (not shown). Side walls 34 and 36 include rectangular openings 46 and 48, respectively, through which conveyor assembly 50 extends, as illustrated in FIG. 1.

The rear portion of cabinet assembly 12 includes an inner wall 52 and an outer wall 54 between which there is a layer of insulating material 58 (FIG. 2). Inner and outer walls 52 and 54 are additionally secured together by means of bolt assemblies 56 for further strengthening. Cabinet assembly 12 further includes a top panel 60, which is secured to side walls 34 and 36 and rear wall 52, 54.

Cabinet assembly 12 is provided with a door assembly 68 (FIG. 2), which comprises a door 72, which is hingedly connected to cabinet 12 by means of hinges 70 and can be swung open and closed by handle 74. Door 72 is provided with an access door 76 to provide for the insertion or removal of food products from conveyor assembly 50 without the necessity of opening the larger door 72.

Figure 6:
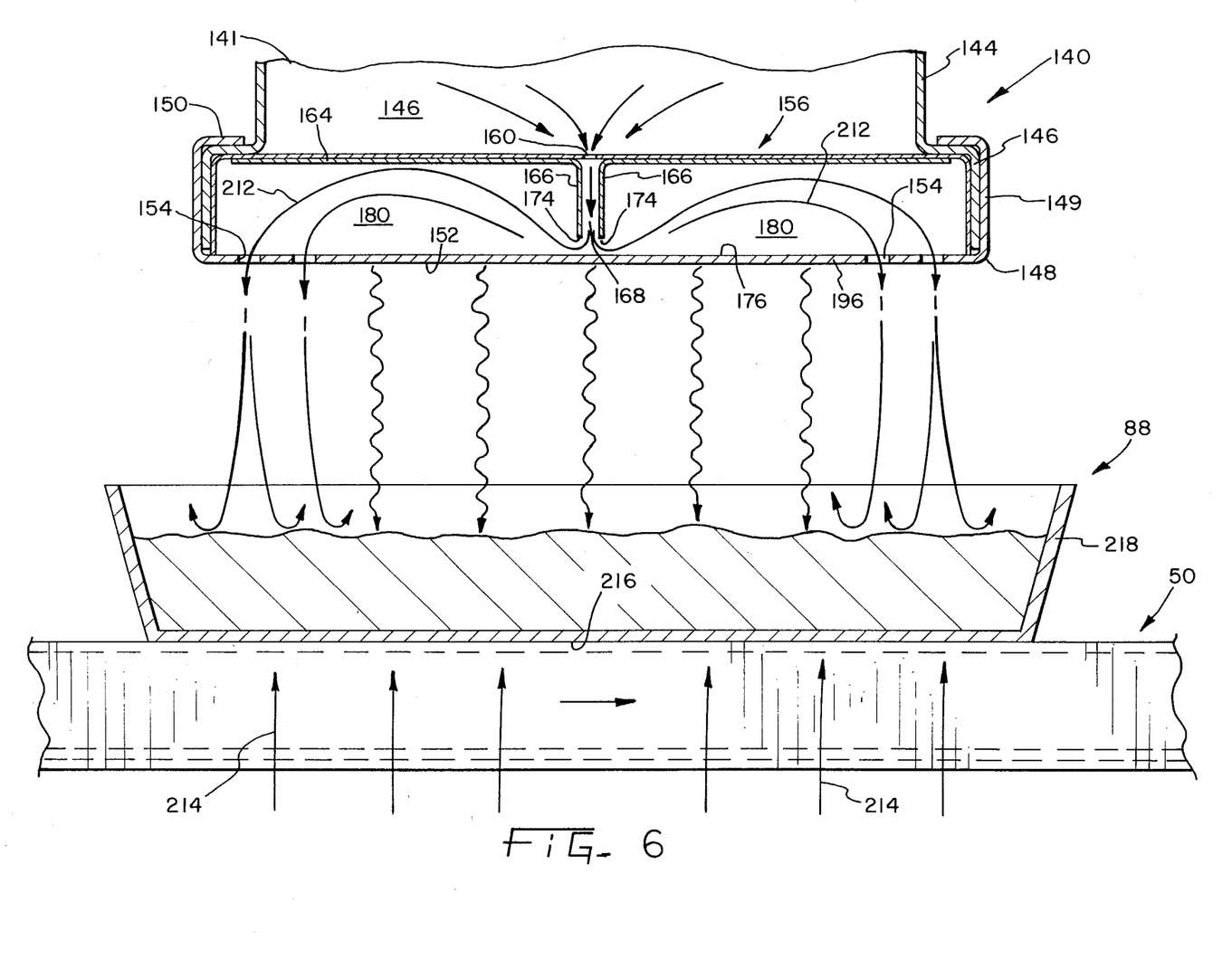
FIG. 6 is an enlarged sectional view showing the pattern of air flow and infrared radiation from the radiant panel duct onto a food product.

Conveyor assembly 50 includes a conveyor frame 77 including frame sides 80 and 82, and which extends through openings 46 and 48 of cabinet portion 12. Conveyor assembly 50 comprises an endless conveyor belt 84 that is sprocket driven and is supported on guides 86. Conveyor assembly 50 serves as the support for the food products 88 that pass through the heating chamber 90 defined within cabinet portion 12, as illustrated in FIGS. 1 and 6.

A motor assembly is provided for rotating impeller 126 and includes a motor 128 mounted to frustoconically shaped interior shroud 130. A collar 132 surrounds impeller 128 and aids in guiding air to impeller 126. As impeller 126 is rotated, air is drawn rearwardly of fingers 108, around plenum 92 and through opening 104.

Heat source 134 includes a burner and blower 136 wherein the blower supplies air to the burner for proper combustion of gas which flows into the burner heat through a gas inlet pipe and gas valve (not shown). Heat is generated by a flame from burner 136 in the customary fashion. While a gas fueled heating source is illustrated, it should be understood that an electric heat source could also be used.

Figures 4, 5:
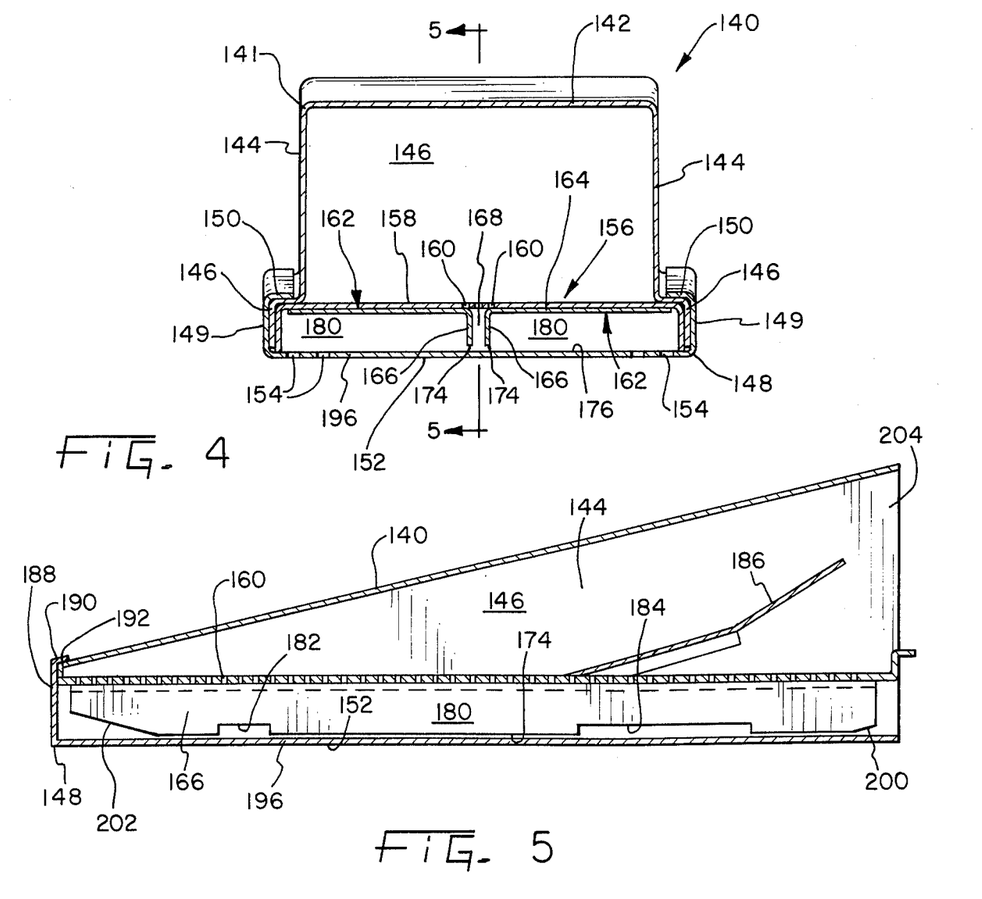
FIG. 4 is transverse sectional view of the radiant panel and duct oriented such that the apertures face downwardly.
FIG. 5 is a sectional view taken along the line 5—5 of FIG. 4 and viewed in the direction of the arrows.

Up to this point, the structure and operation of oven 8 is similar to the ovens described in the aforementioned patents. Heated air flows through duct fingers 108 and out nozzles 122 in a columnar fashion to impinge on the food product 88 on conveyor 20. Unlike the prior ovens, however, the upper duct fingers have been replaced with radiant panel ducts 140, which include some similarities to finger ducts 108 but differ in the manner in which heat energy is supplied to food product 88. Each of radiant panel ducts 140 comprises a stainless steel main duct portion 141 including top 142 and generally triangular sides 144 which form a main duct chamber 146 (FIG. 4). The lower portion of each of radiant panel ducts 140 is bent into a generally L-shaped configuration forming flanges 146. Slidably connected to flange portions 146 is an aluminum radiant panel 148 having sides 149 and flanges 150 within which the flange portions 146 of main duct 142 are received.

Figure 7:
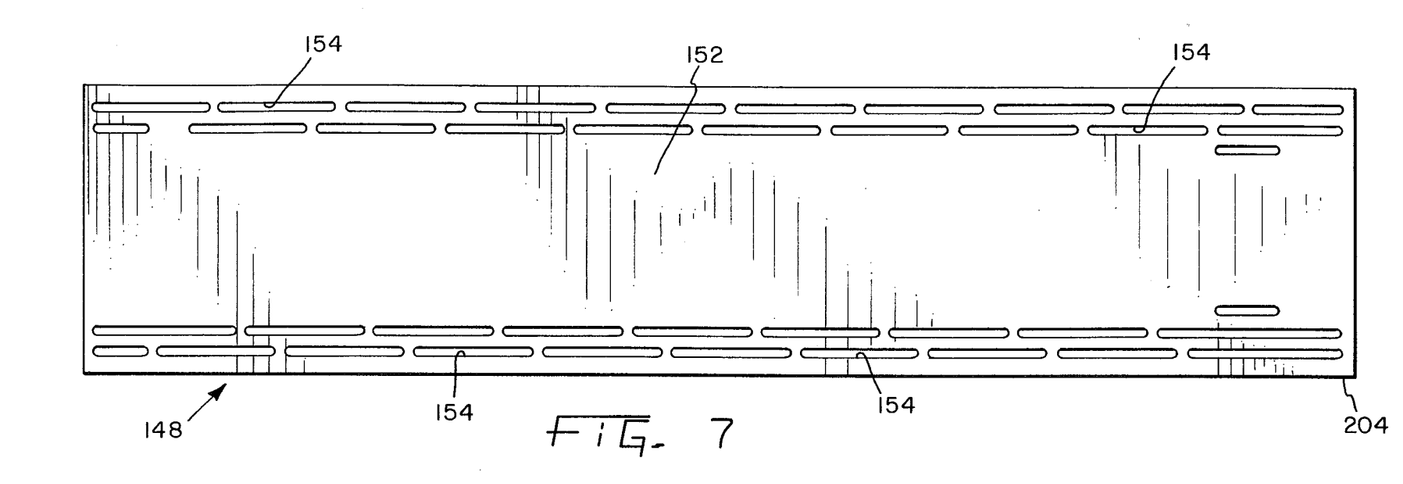
FIG. 7 is a plan view of the radiant panel.
Figure 8:
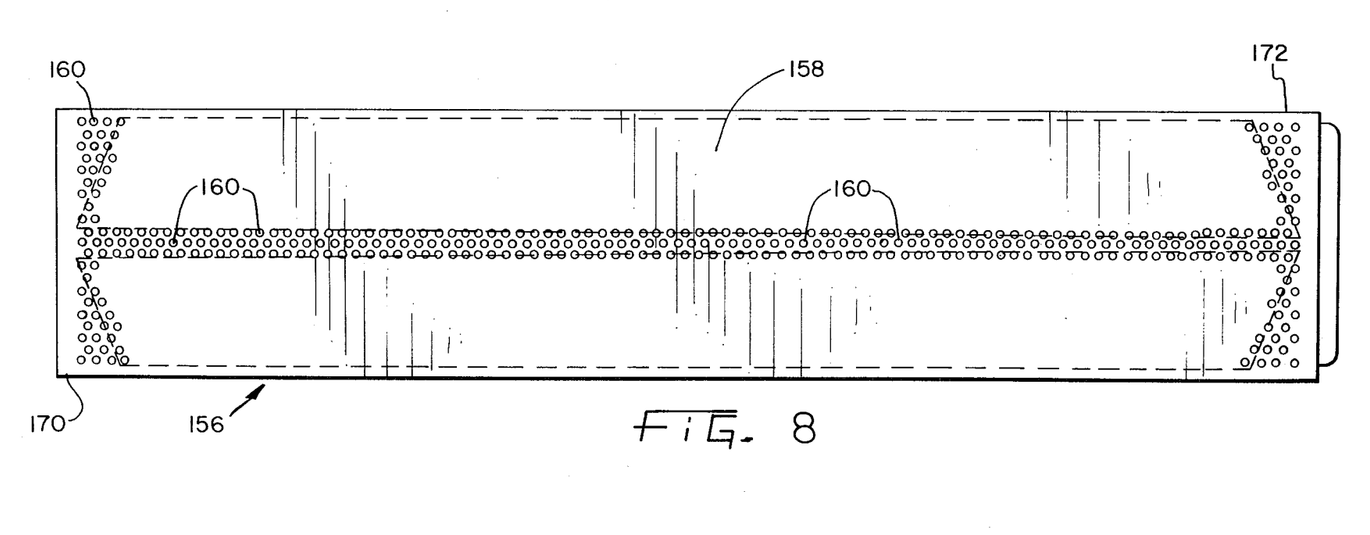
FIG. 8 is a top plan view of the radiant panel insert plate assembly.
Figure 9:
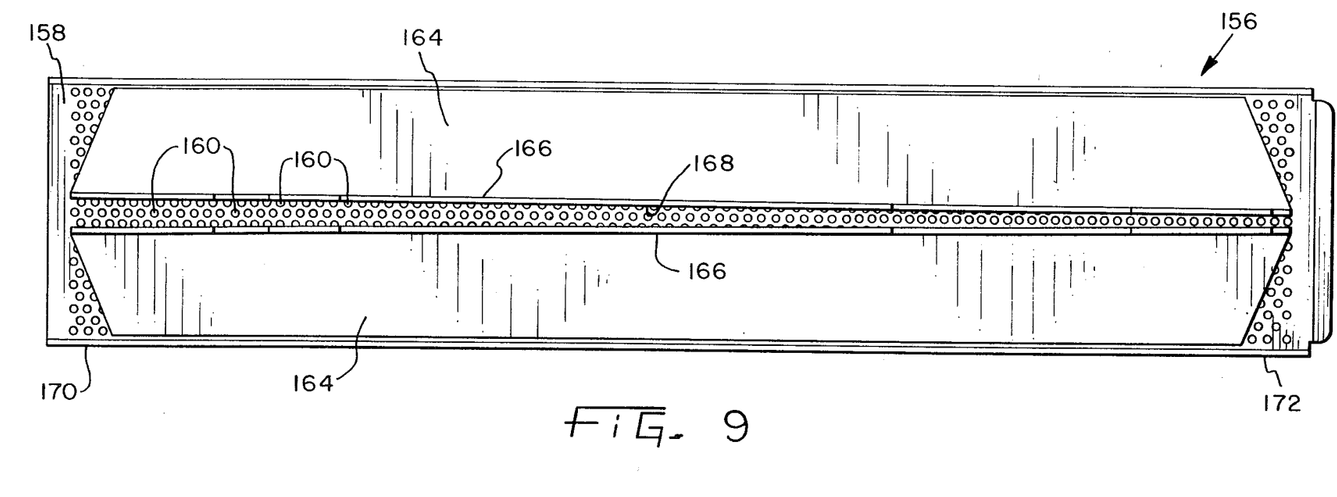
FIG. 9 is a bottom plan view of the radiant panel insert plate assembly.

Radiant panel 148 has a lower surface 152 which faces downwardly, in the preferred embodiment disclosed, toward the food product support conveyor 84. Radiant panel 148 is provided with a plurality of slots 154, which may be arranged in the pattern shown in FIG. 7, and which also face toward the food product support conveyor 84. Slots 154 may be ⅜ inch in diameter and 3 inches long. Disposed within main duct 142 is an insert plate assembly 156 comprising a U-shaped plate 158 having a plurality of apertures or perforations 160 as illustrated in FIGS. 4, 8 and 9. Spot welded or otherwise secured to plate 154 are a pair of L-shaped baffle plates 162 comprising horizontal portions 164 and vertical portions 166, the latter being spaced apart and forming a central channel 168, which tapers from the forward end 170 of insert plate assembly 156 toward the rearward end 172 thereof, which attaches to plenum 92. The lower edges of portions 166 of baffle plates 162 are spaced away from the inner surface 176 of radiant panel 148 so as to form a pair of longitudinal gaps or slots 174 to permit air to flow from channel 168 into the secondary chambers 180 formed between the inner surface 176 of radiant panel 148 and insert plate assembly 156.

As illustrated in FIG. 5, vertical portions 166 of insert plate assembly 156 may be provided with notches 182 and 184 located at the forward and rearward portions of radiant panel duct assembly 140 so as to inrease the flow of heated air from center channel 168 into secondary chambers 180. Furthermore, a deflector 186 of the type used in duct fingers 108 may be provided to adjust the flow of heated air to the forward and rearward portions of center channel 168 With further reference to FIG. 5, it can be seen that the forward end 188 of radiant panel 148 includes a lip 190 which fits around the forward end 192 of duct 140. As indicated earlier, duct 140, radiant panel 148 and insert plate assembly 156 are all slidably connected. This enables the parts to be disassembled for cleaning and also provides clearance between these parts which enables the stainless steel duct 141 to expand thermally at a different rate than aluminum radiant panel 148.

The lower surface 152 of the bottom wall 196 of radiant panel 148 is hardcoat anodized aluminum having a black emissive surface and and thickness of approximately 0.070 inches. The anodized coating is black in color so that the lower wall 196 of panel 148 acts as a "black body" for good heat absorption and radiation. The anodized finish can consist of sulfuric anodized Type III hardcoat.

Radiant panel ducts 140 are open at their rear ends and are connected to plenum 92 in the same manner as finger ducts 108.

Radiant panel ducts 140 are preferably spaced in vertical alignment with corresponding lower finger ducts 108, although staggered or other arrangements of ducts 140 and 108 can be employed. Furthermore, radiant panel ducts 140 could be substituted for finger ducts 108, if desired, such as in applications where impingement heat transfer is not necessary or where it is desirable to impart thermal energy to the food product 88 at a lower rate. Referring to FIG. 5, baffle plates 166 can be notched as at 200 and 202 shown in FIG. 5. FIG. 5 also shows that the rear portion 204 of the radiant panel duct 140 is open for communication with the interior 106 of plenum 92. As shown in FIG. 8, insert plate assembly 156 is provided with further apertures 160 located at the ends thereof.

Oven 8 operates in the following manner. Impeller 126 draws heated air form heat chamber 210 located behind plenum 92 through opening 104 in collar 132, through plenum chamber 106 into finger ducts 108 and radiant panel ducts 140. The heated air from finger ducts 108 is emitted in discrete columns from below onto the food product 88 supported on conveyor 50. Return air is then drawn rearwardly between and around duct fingers 108, through heating chamber 210 and into plenum 92 in a continuous fashion.

Heated air from plenum 106 travels forwardly within main duct chambers 146 of radiant panel ducts 140 and then downwardly through openings 160 in insert plate 156 into center channel 168 (FIG. 6). The heated air impinges on the inner surface 176 of the lower wall 196 of radiant panel 148 and then flows laterally through gaps 174 and notches 182, 184, 200 and 202 formed between portions 166 of insert plate assembly 156 and the inner surface 176 of lower wall 196.

The heated air imparts heat to lower wall 196 as it impinges thereon in the region of channel 168, and imparts further heat as it sweeps past surface 176 as indicated by arrows 212 in FIG. 6. Since the lower wall 196 of panel 148 is made of aluminum and is, therefore, a very good conductor of heat, the heat imparted to wall surface 176 is conducted through wall 196 and heats the outer surface 152 of lower wall 196. Because the outer surface 162 is black in color and functions as a "black body", this heat is radiated toward food product 88 in the form of infrared radiation.

The heated air tends to curl upwardly and then downwardly in secondary chambers 180 as shown in FIG. 6, so that the air exits through openings 154 in a direction generally normal to the food product 88 which is supported on conveyor 50. By orienting the heated air in this fashion, better heat convection and transfer of heat to food product 88 is accomplished. However, unlike impingement nozzles 122 in finger ducts 108, the heated air impinges on the food product in a fashion which is more dispersed and therefore does not impart heat to food product 88 at the high rate which is associated with impingement. However, impingement air columns 214 can impinge directly on the lower surface 216 of the food product 88 or its container 218.

The curling of the air 212 within secondary chambers 180 is produced because of the impingement on lower wall 196 and then the subsequent movement of the air upwardly and laterally toward the outside edges where the air then changes direction and flows downwardly toward openings 154. Because the air impinges initially in the center region of wall 196, the highest amount of heat transfer will occur in this region, with slightly lower amounts of heat being radiated from the regions laterally outwardly of the center region. The region of radiant energy as shown in FIG. 5 is bordered by columns of heated convection air.

Although channel 168 is shown in the preferred embodiment as being located in the central region of duct 140, alternative configurations are possible. For example, apertures 154 could be located centrally and air could be introduced into secondary chambers 180 through channels (not shown) located near the outer lateral edges of chambers 180. However, the centralized impingement of the heated air on wall 196 with the subsequent laterally outward flow of heated air, as shown in FIG. 6, is preferred.

Food product 88 may be any type of food which can be suitably baked or cooked in an oven of the type shown. For example, food product 88 may be a pan pizza as illustrated, or may be biscuits, meat portions, fish, etc. The food product 88 is preferably moved through heating chamber 90 by means of conveyor 50 so that all portions of the upper and lower surfaces of food product 88 will be uniformly cooked.

Return air flow from radiant panel ducts 140 flows rearwardly between and around ducts 140 in a manner similar to finger ducts 108. Because the air flows toward the food product as it exits secondary chambers 180, the return air flow pattern is similar to that of conventional impingement ovens and does not result in the stagnation of heated air within the upper portion of heating chamber 90.

By means of the oven illustrated and described above, the top surfaces of the food product 88 will be heated by means of heat radiated downwardly with the additional convection air currents, whereas the bottom of the food product 88 will be heated by means of upward impingement of heated air from lower duct fingers 108. Thus, a substantially higher amount of heat energy will be transferred to the food product 88 by means of the impingement being processed than by means of the radiant/convection heating process. Therefore, the oven arrangement is particularly suited to foods wherein the top surface of the food should be gently but uniformly heated and wherein the bottom surface of the food product should be heated with higher heat energy transfer. An example of one such food product is a deep dish pizza where the top layer generally consists of one or more types of cheeses on which may be placed toppings, such as mushrooms or onions, which are quite easily burned. The radiant/convection heating will heat the upper surfaces of the pizza more gently whereas the crust can be completely baked by means of the more severe impingement heating from duct fingers 108.

While this particular embodiment of the oven shows the utilization of radiant panels to an impingement oven, the radiant panels could also be applied equally well in a convection oven. Furthermore, the duct fingers 108 could be completely replaced by the radiant panel fingers so that radiant/convection heat energy is supplied to both surfaces of the food product. The invention is also applicable to non-conveyorized ovens wherein the food product remains stationary within the oven cavity.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A food preparation oven comprising:
an enclosure defining a chamber for receiving a food product therein,
support means for supporting a food product in said chamber,
means for producing a moving mass of heated air, and
a duct connected to said means for producing, said duct having a thermally conductive wall with an outer radiant energy emissive surface means for radiating infrared energy toward said support means when said wall is heated, said wall having a plurality of apertures therein facing toward said support means,
said duct including means therein for conveying heated air from said means for producing over an inner surface of said wall to thereby heat the wall and then conveying the heated air towards and through said apertures toward said support means.

2. The food preparation oven of claim 1 wherein said means for conveying comprises baffle means for channeling heated air toward a localized area of an inner surface of said wall and causing the heated air to sweep past said inner surface to thereby impart heat to said inner wall.

3. The food preparation oven of claim 1 wherein said means for conveying comprises baffle means for causing heated air to impinge on a localized area of an inner surface of said wall and then to sweep past said inner wall surface toward said apertures to thereby impart heat to said wall.

4. The oven of claim 1 wherein said means for conveying comprises means for causing the heated air to change direction within said duct after impingement on said inner surface whereby the heated air flows in a direction generally normal to said apertures just before flowing through said apertures.

5. The oven of claim 3 wherein said duct is elongate and wherein said means for channeling comprises a longitudinal channel in said duct having an elongate outlet facing the inner surface of said wall.

6. The oven of claim 5 wherein said duct includes sides and said channel extends substantially the length of said duct and is located generally centrally between the sides of said duct, and said apertures are located near the sides of said duct.

7. The oven of claim 5 wherein the outlet of said channel is spaced away from said inner surface to form longitudinal gaps extending along the length of said duct.

8. The oven of claim 7 including notches in localized areas in said channel for forming enlarged outlet areas in said channel that have a larger flow area than said longitudinal gaps.

9. The oven of claim 3 wherein said apertures are elongate slots.

10. The oven of claim 1 wherein said outer surface is black.

11. The oven of claim 1 wherein said outer surface is an infrared emissive surface.

12. The oven of claim 1 wherein said support means comprises a conveyor traveling through said chamber in a first direction and said duct is generally elongate and extends one of above or below said conveyor in a direction generally perpendicular to a vertical plane coincident with the direction of travel of said conveyor.

13. The oven of claim 1 wherein said duct is elongate and said means for conveying includes: a baffle in said duct forming a longitudinal main duct chamber connected to said means for producing, a longitudinal secondary chamber in said second chamber being defined by said wall and said baffle and being positioned between said main chamber and said support means, and an elongate channel means extending between said main and secondary chambers for channeling heated air from said main chamber to impinge onto said wall inner surface, said wall inner surface being substantially imperforate in the area where the heated air impinges thereon.

14. The oven of claim 13 wherein said channel means includes side walls that extend toward said wall inner surface and terminate in edges, said side wall edges being spaced apart from said wall inner surface to form longitudinal gaps that permit heated air to flow from the channel and around said edges into said secondary chambers.

15. The oven of claim 13 wherein said duct includes sides and said channel is positioned generally centrally of said sides.

16. The oven of claim 1 wherein said support means is a conveyor traveling through said chamber in a first direction, and including a plurality of said ducts, said ducts being elongate and extending perpendicular a vertical plane coincident with the direction of travel of said conveyor.

17. The oven of claim 16 wherein said means for producing heated air comprises a plenum connected to said ducts, means for heating air and fan means for pressurizing the heated air in said plenum.

18. The oven of claim 1 wherein said wall comprises an imperforate first section including said inner surface over which the heated air in said duct means is conveyed and a second section including said apertures.

19. The oven of claim 18 wherein said imperforate section is located n a center area of said duct wall and said second section is located at side edge areas of said duct.

20. A food preparation oven comprising:

an enclosure defining a chamber for receiving a food product therein, support means for supporting a food product in said chamber, means for producing a moving mass of heated air, and a combination convection and radiant energy duct means in said chamber connected to said means for producing a moving mass of heated air for conveying a stream of the heated air in said duct means, said duct means including radiator means having aperture means therein directed toward said support means for directing heated air onto a food product supported on said support means, said radiator means having an infrared emissive outer surface and an imperforate inner surface in contact with the stream of air in said duct means for absorbing heat from the stream of air in the duct means as it sweeps past said imperforate inner surface and radiating heat from said emissive surface toward a food product on the support means.

21. The oven of claim 20 wherein said duct means includes means for causing heated air in said duct means to impinge on a localized area of said surface of said radiator means and then to sweep past said inner sufface toward said apertures to thereby heat said radiator means and cause said outer surface thereof to radiate infrared heat.

22. The oven of claim 21 including means in said duct means for causing the stream of air to swirl and become oriented in a direction normal to said apertures just before flowing outwardly through said apertures.

23. A food preparation oven comprising:

an enclosure defining a chamber for receiving a food product therein, support means for supporting a food product in said chamber, an air plenum and means connected thereto for producing heated moving air in said plenum, said plenum including an inlet for receiving return air from said chamber and an outlet, a duct having an inlet-connected to said plenum outlet and a plurality of outlet openings directed toward said support means, said duct including a radiant panel including a radiant energy section that is imperforate, said panel having an inner surface in said duct and an outer surface facing said support means, said outer surface being infrared emissive, said duct further including means therein for causing heated air in said duct to impinge on said inner surface in a direction generally normal to said inner surface and sweep over said inner surface and then flow out of said outlet openings in a direction toward said support means, whereby the impingement on and sweeping of the air over said inner surface produces heat,that is transmitted fromt he inner to the outer surface thereby causing the outer surface to emit infrared radiation.

24. The oven of claim 23 wherein said apertures are in a section of said radiant panel immediately adjacent said radiant energy section.

25. The oven of claim 24 wherein said duct comprises a main duct portion and said radiant panel is loosely connected to said main duct portion whereby the radiant panel and main duct portion can thermally expand at different rates without warpage.

26. The oven of claim 23 wherein said duct comprises a main duct portion and said radiant panel is loosely connected to said main duct portion whereby the radiant panel and main duct portion can thermally expand at different rates without warpage.

27. The oven of claim 26 wherein said duct main portion and said radiant panel are of materials having different coefficients of thermal expansion.

28. The oven of claim 25 wherein said radiant panel is slidably connected to said duct main portion.

29. The oven of claim 23 wherein said support means is a conveyor that extends through said chamber, and including a plurality of said ducts positioned above said conveyor and including a plurality of impingement means for directing columns of heated air upwardly toward said conveyor.

30. The oven of claim 29 wherein said ducts are above said conveyor and said impingement means are below said conveyor.

31. The oven of claim 23 including a plurality of said ducts positioned above said support means and including a plurality of impingement means for directing columns of heated air upwardly toward said support means.

32. A food preparation oven comprising:

an enclosure defining a chamber for receiving a food product therein, support means for supporting a food product in said chamber, means for producing a moving mass of heated air, a plurality of ducts in said chamber positioned one of below and above said support means, said ducts being connected to said means for producing, each of said ducts having a thermally conductive wall with an outer radiant energy emissive surface means for radiating infrared energy toward said support means when said wall is heated, said wall having a plurality of apertures therein facing toward said support means, said duct including means therein for conveying heated air from said means for producing over an inner surface of said wall to thereby heat the wall and then conveying the heated air towards and through said apertures toward said support means, and means on the opposite side of said support means and said ducts for blowing heated air toward said support means.

33. The oven of claim 32 wherein means for blowing heated air comprises at least one impingement means for directing a plurality of columnated jets of heated air toward said support means.

* * * * *